(12) United States Patent
Kirihara et al.

(10) Patent No.: US 11,016,515 B2
(45) Date of Patent: May 25, 2021

(54) SYSTEM OPERATION DECISION-MAKING ASSISTANCE DEVICE AND METHOD

(71) Applicant: Hitachi, Ltd., Tokyo (JP)

(72) Inventors: Kenta Kirihara, Tokyo (JP); Nao Saito, Tokyo (JP); Taichiro Kawahara, Tokyo (JP); Masahiro Yatsu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 248 days.

(21) Appl. No.: 16/337,937

(22) PCT Filed: Oct. 6, 2017

(86) PCT No.: PCT/JP2017/036430
§ 371 (c)(1),
(2) Date: Mar. 29, 2019

(87) PCT Pub. No.: WO2018/138973
PCT Pub. Date: Aug. 2, 2018

(65) Prior Publication Data
US 2019/0220051 A1 Jul. 18, 2019

(30) Foreign Application Priority Data
Jan. 30, 2017 (JP) .............................. JP2017-013794

(51) Int. Cl.
*G05F 1/66* (2006.01)
*G06K 9/62* (2006.01)
(Continued)

(52) U.S. Cl.
CPC .............. *G05F 1/66* (2013.01); *G06K 9/6226* (2013.01); *G06Q 10/04* (2013.01); *H02J 3/00* (2013.01); *H02J 3/24* (2013.01)

(58) Field of Classification Search
CPC ........ G05F 1/66; G06K 9/6226; G06Q 10/04; H02J 3/00; H02J 3/24
(Continued)

(56) References Cited

U.S. PATENT DOCUMENTS

| 2012/0239453 A1* | 9/2012 | Osogami | G06Q 50/06 705/7.25 |
| 2014/0058577 A1* | 2/2014 | Erhart | H02J 3/32 700/297 |

(Continued)

FOREIGN PATENT DOCUMENTS

JP 2007-288878 A 11/2007

OTHER PUBLICATIONS

International Search Report of PCT/JP2017/036430 dated Nov. 7, 2017.

*Primary Examiner* — Robert A Cassity
(74) *Attorney, Agent, or Firm* — Mattingly & Malur, PC

(57) ABSTRACT

A system operation decision-making assistance device includes: a state mode clustering unit that calculates, on the basis of measurement data DB1 of a power system and a clustering parameter DB3, which state mode, from among prescribed state modes, applies to a power system; a state mode collation unit that collates state transition data DB4 indicating transitions between state modes and the calculated state mode to calculate state transition probability data, which is the probability of transitioning from the calculated state mode to each state mode defined in the state transition data; and an accident shift pattern calculation unit that calculates important accident cases on the basis of a system model DB2, an importance parameter DB5 including the importance of a power system accident, the measurement data, and the calculated state transition probability data.

8 Claims, 19 Drawing Sheets

(51) Int. Cl.
   *H02J 3/24*     (2006.01)
   *H02J 3/00*     (2006.01)
   *G06Q 10/04*    (2012.01)
(58) Field of Classification Search
   USPC .......................................................... 700/293
   See application file for complete search history.

(56) References Cited

U.S. PATENT DOCUMENTS

| | | | |
|---|---|---|---|
| 2014/0070617 A1* | 3/2014 | Detmers | H02J 3/32 307/64 |
| 2017/0068760 A1* | 3/2017 | Shoda | G06F 17/18 |
| 2017/0278200 A1* | 9/2017 | Yamazaki | H02J 13/0079 |

* cited by examiner

[FIG. 1]
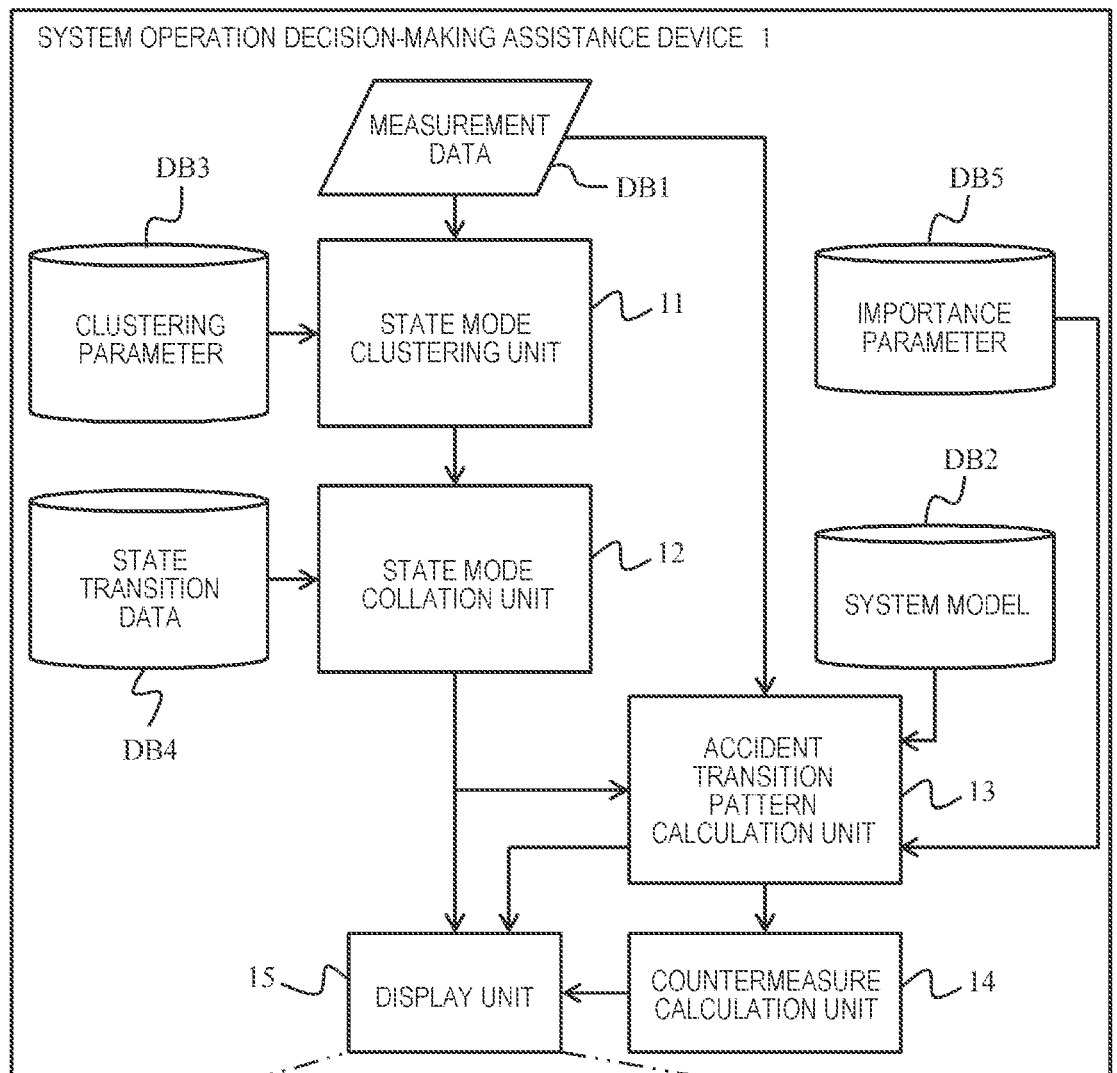
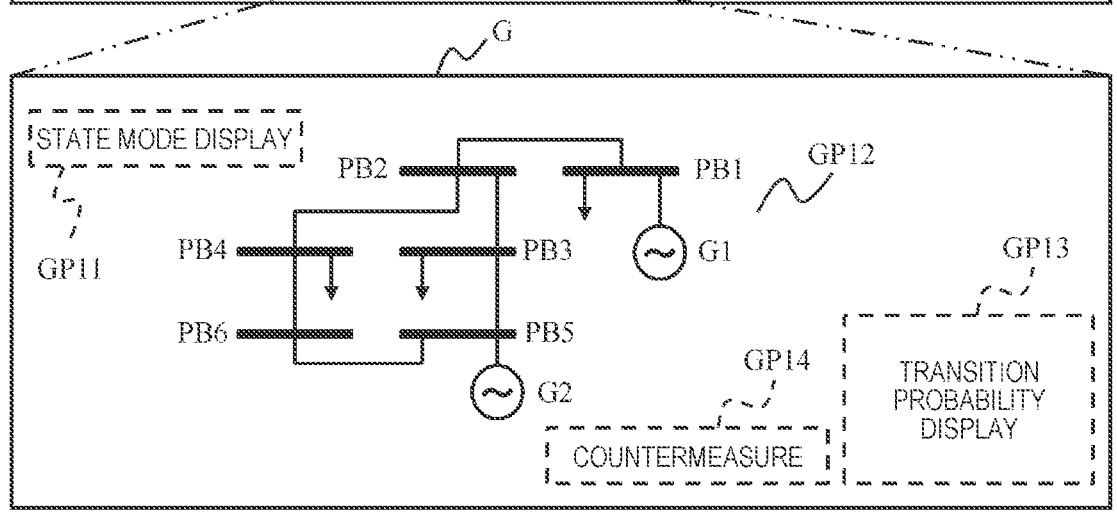

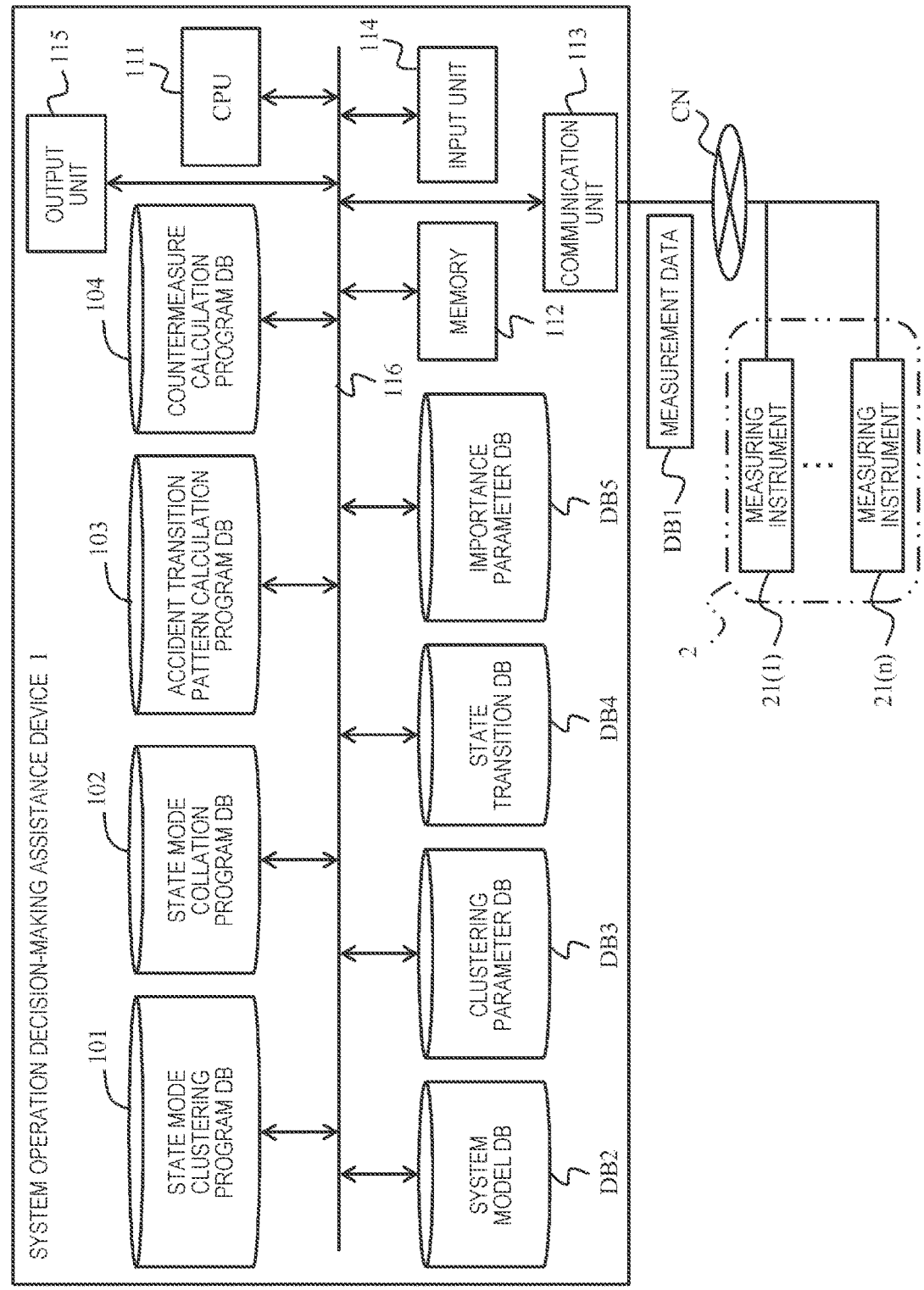
[FIG. 2]

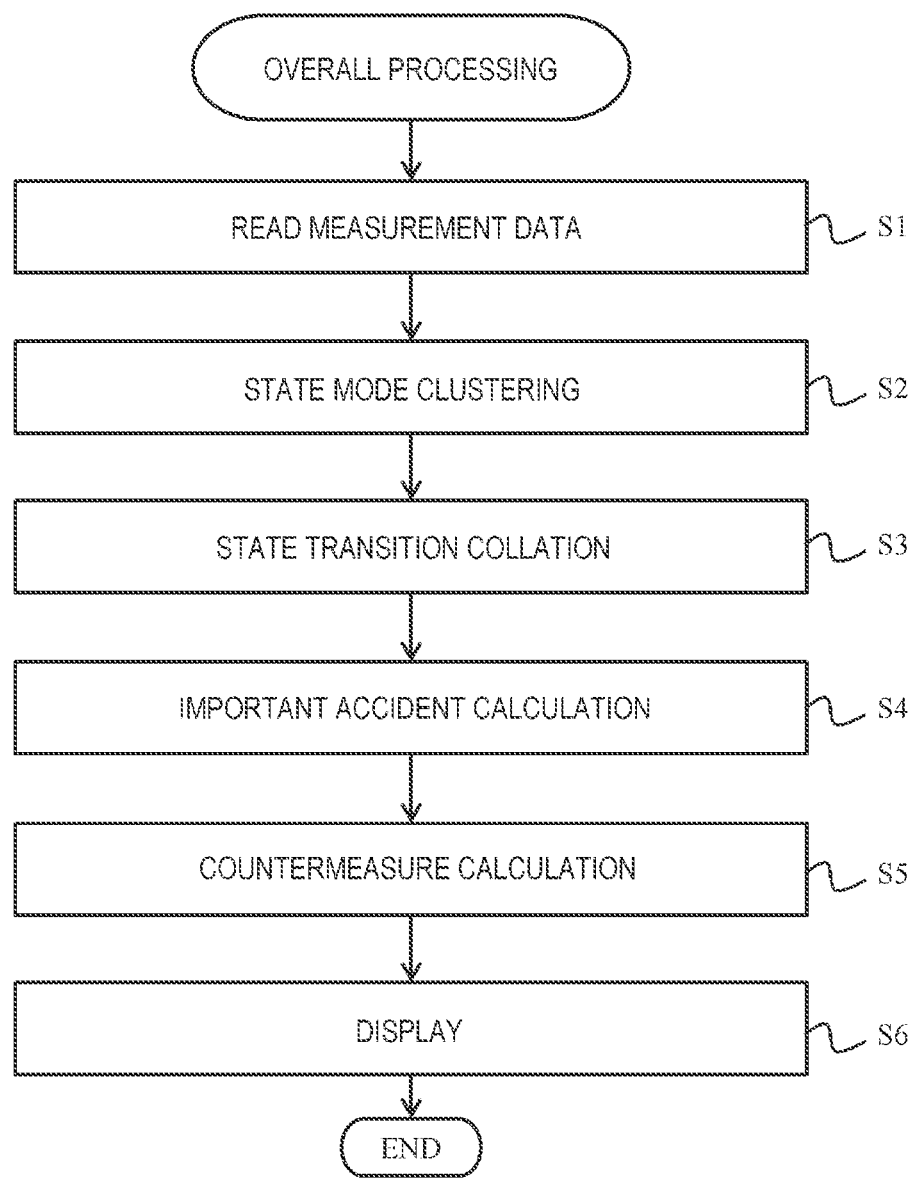

[FIG. 4]
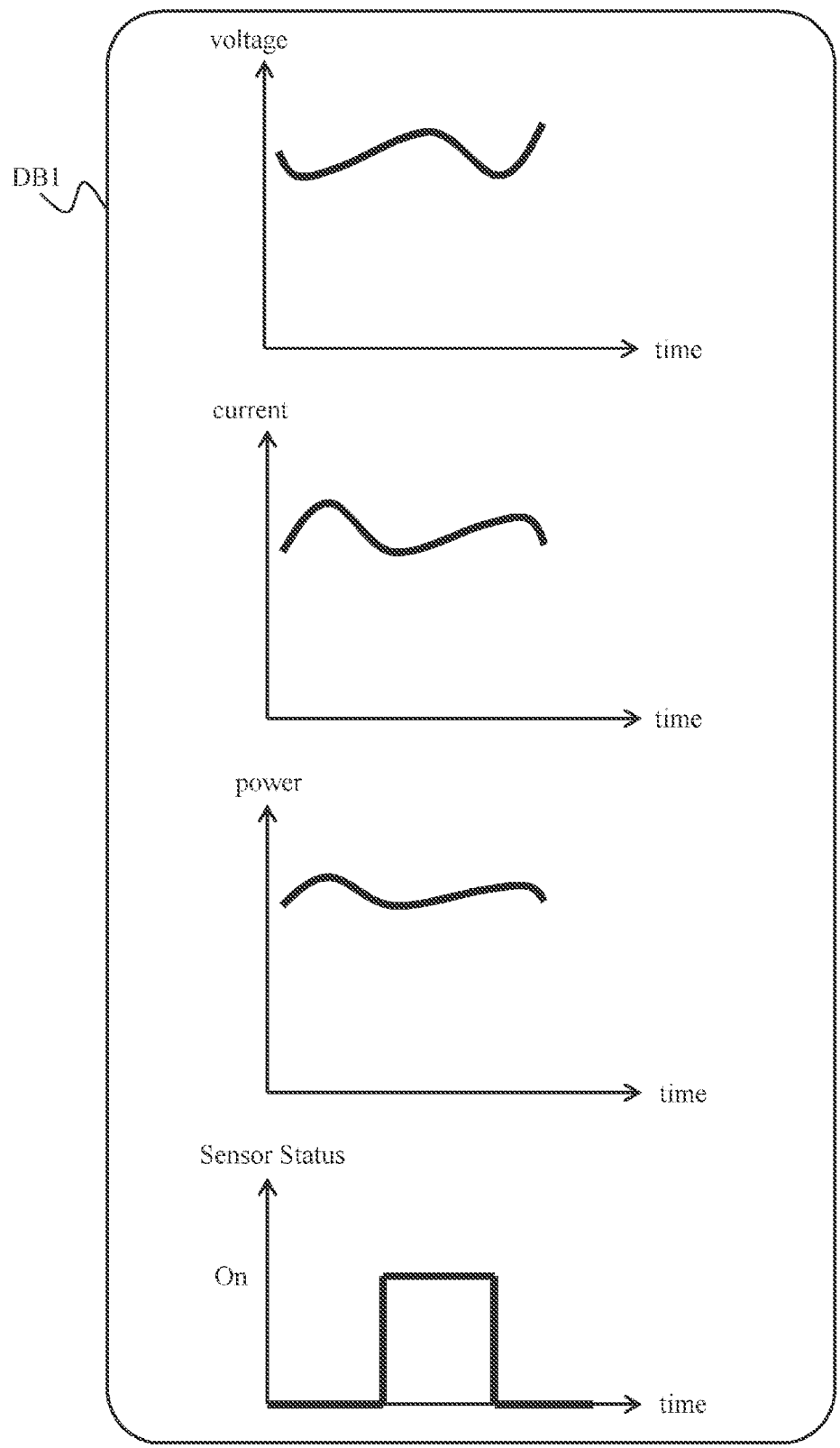

[FIG. 5]
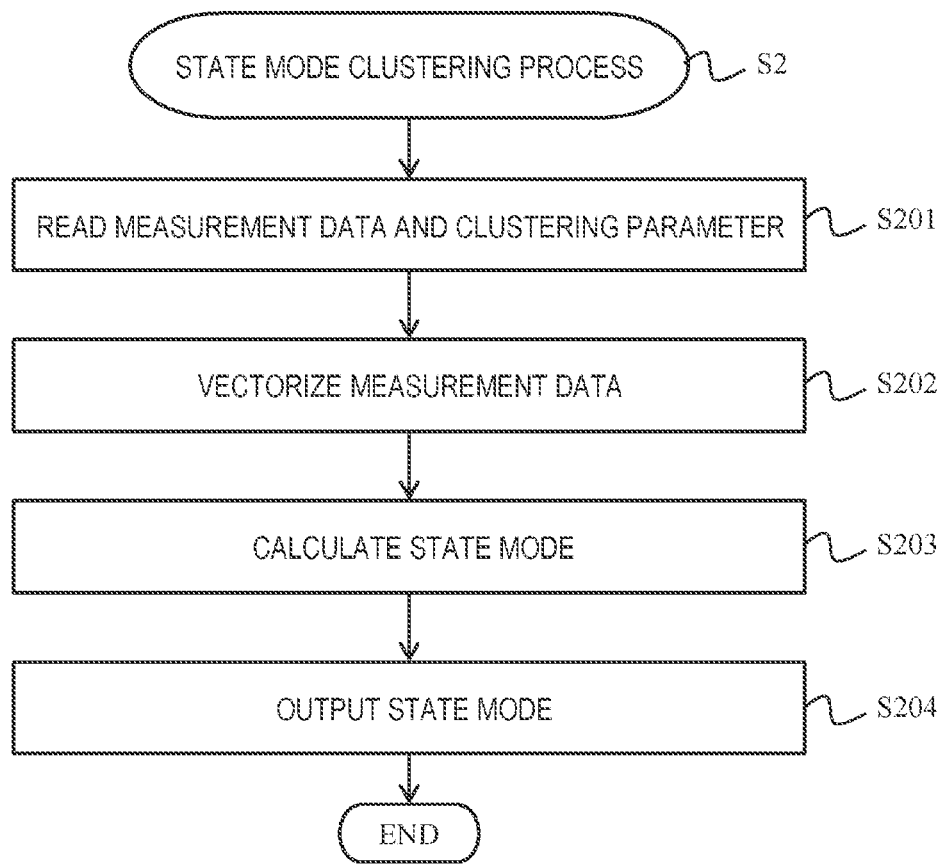

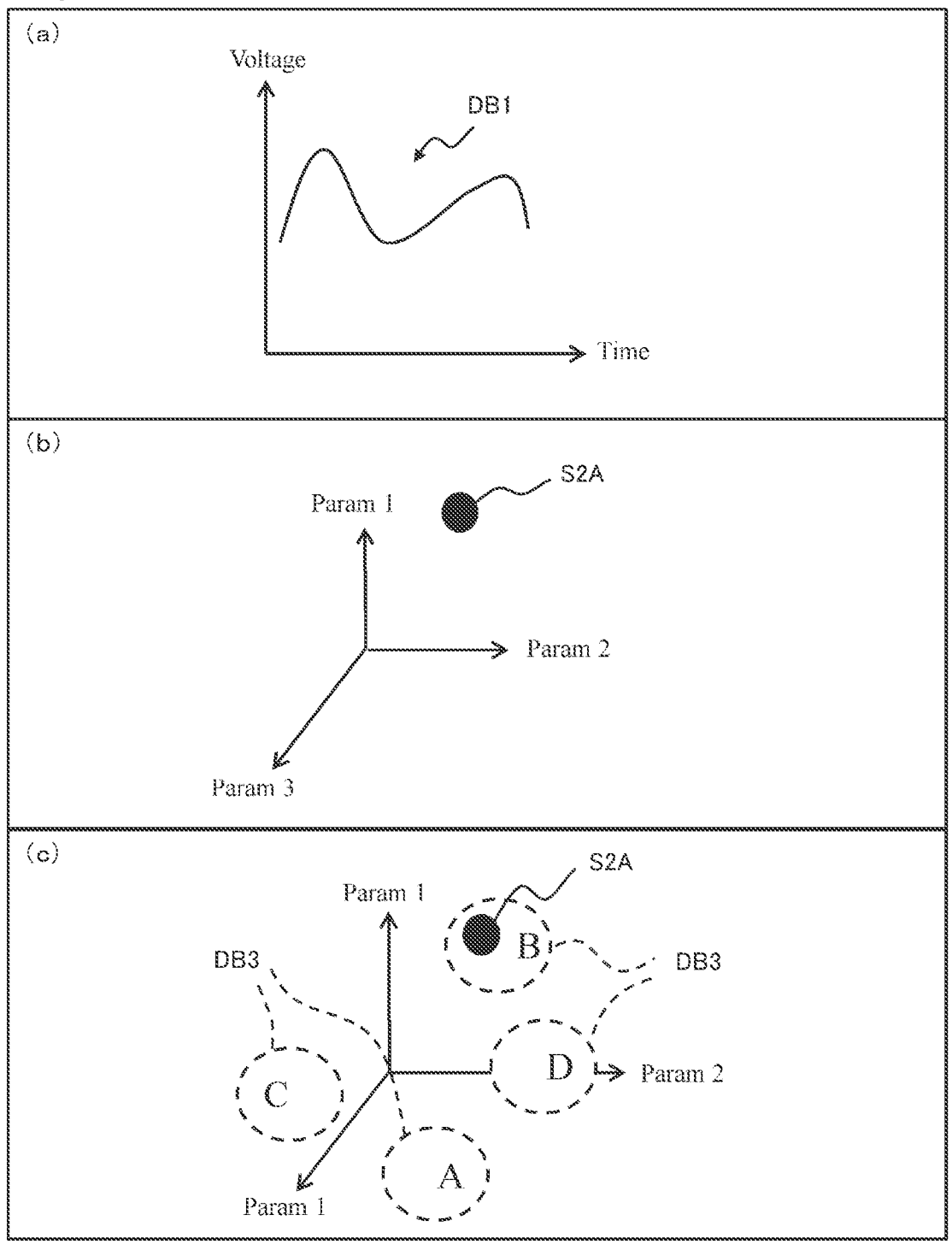
[FIG. 6]

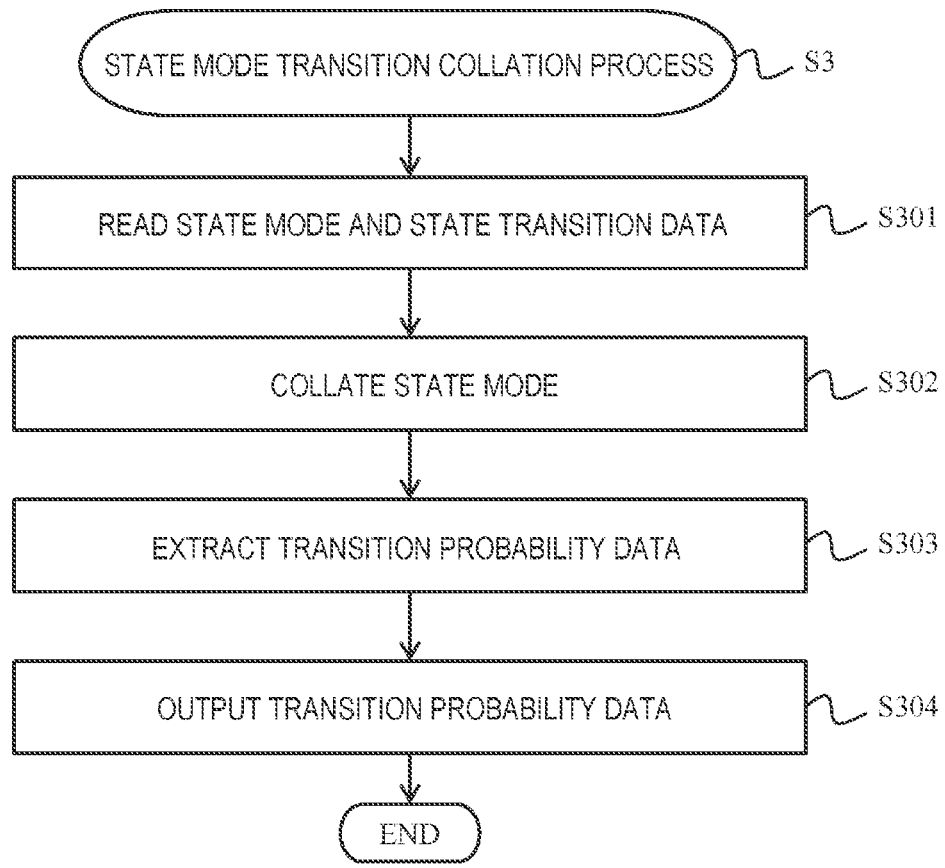

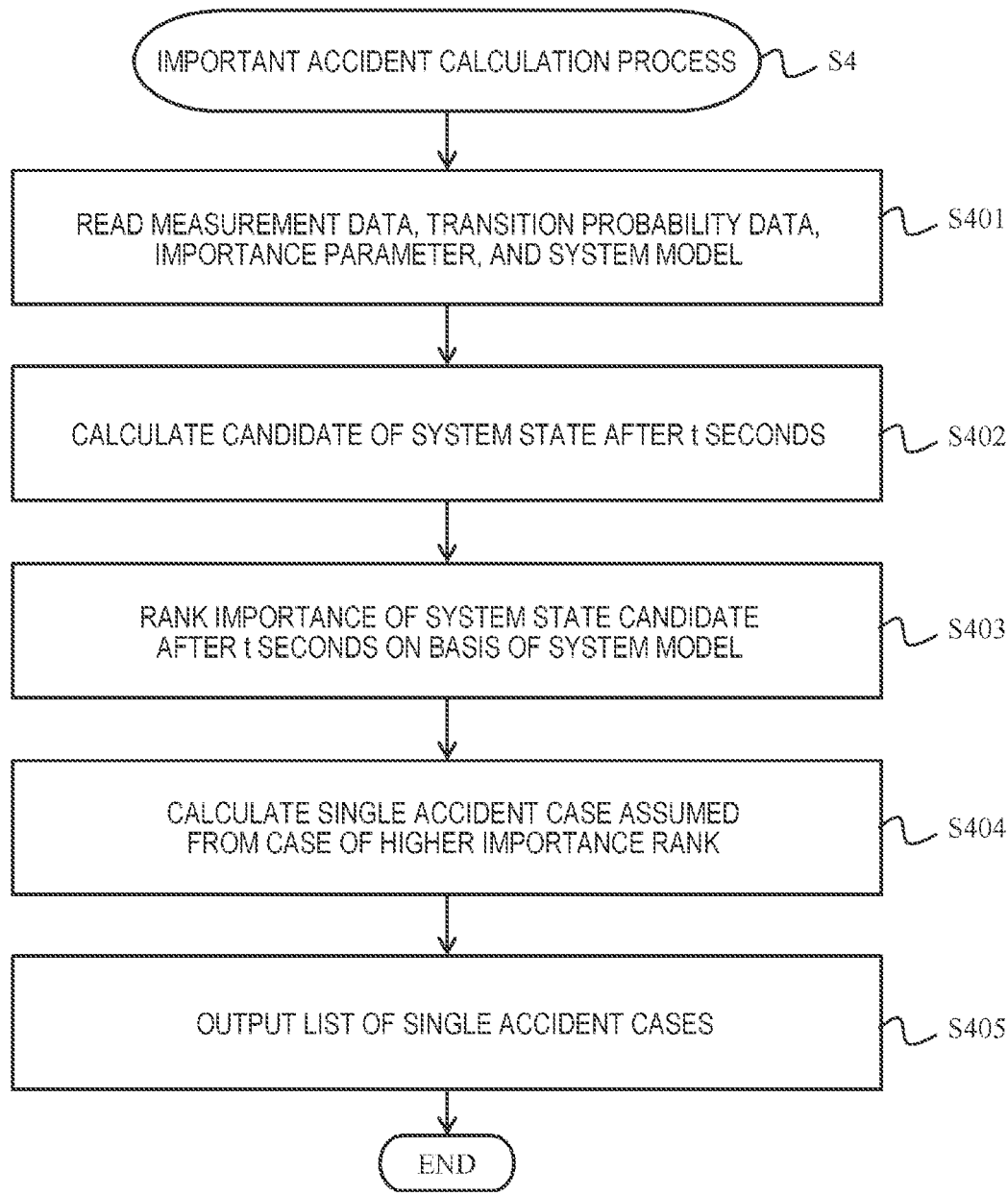

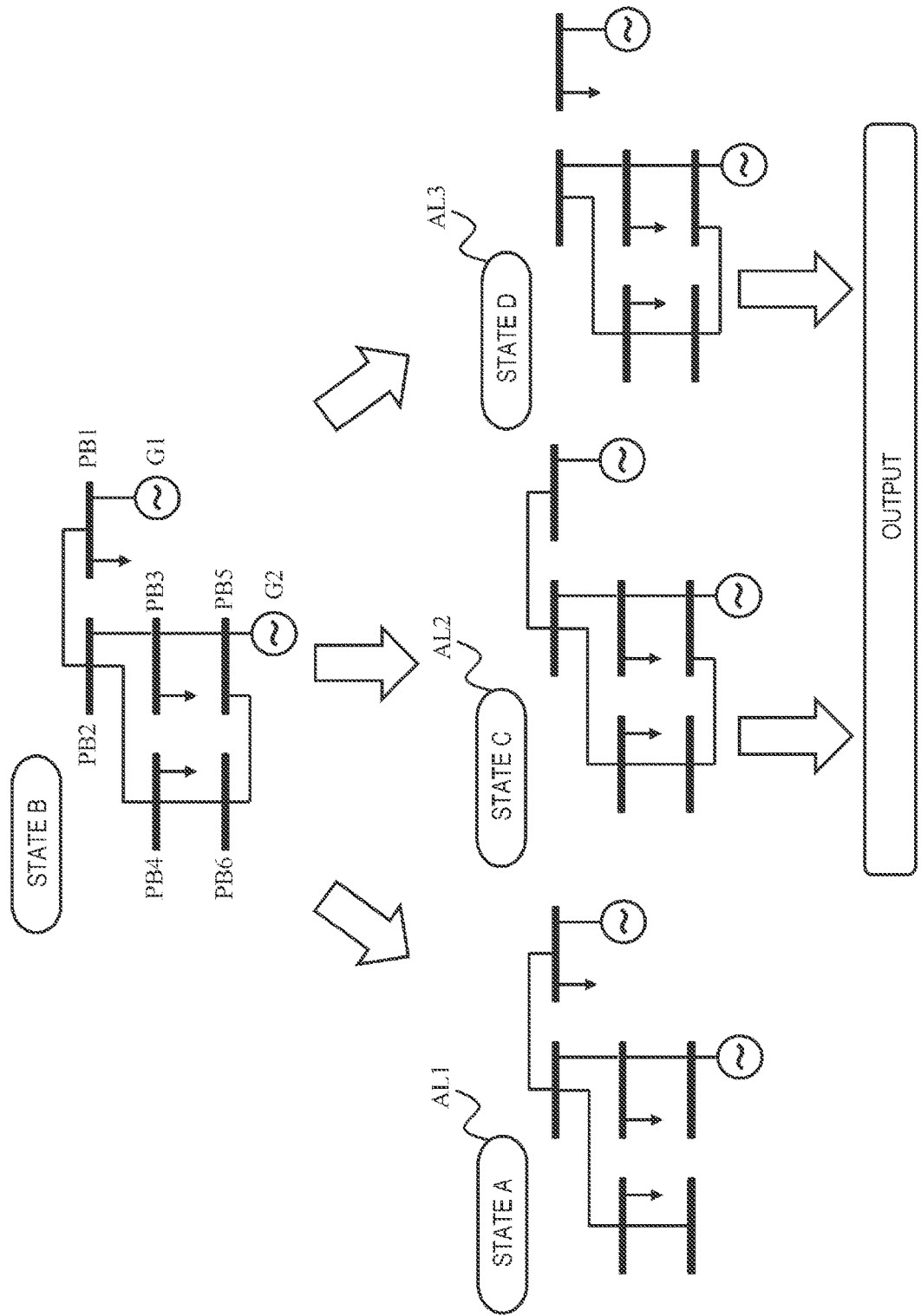

[FIG. 11]
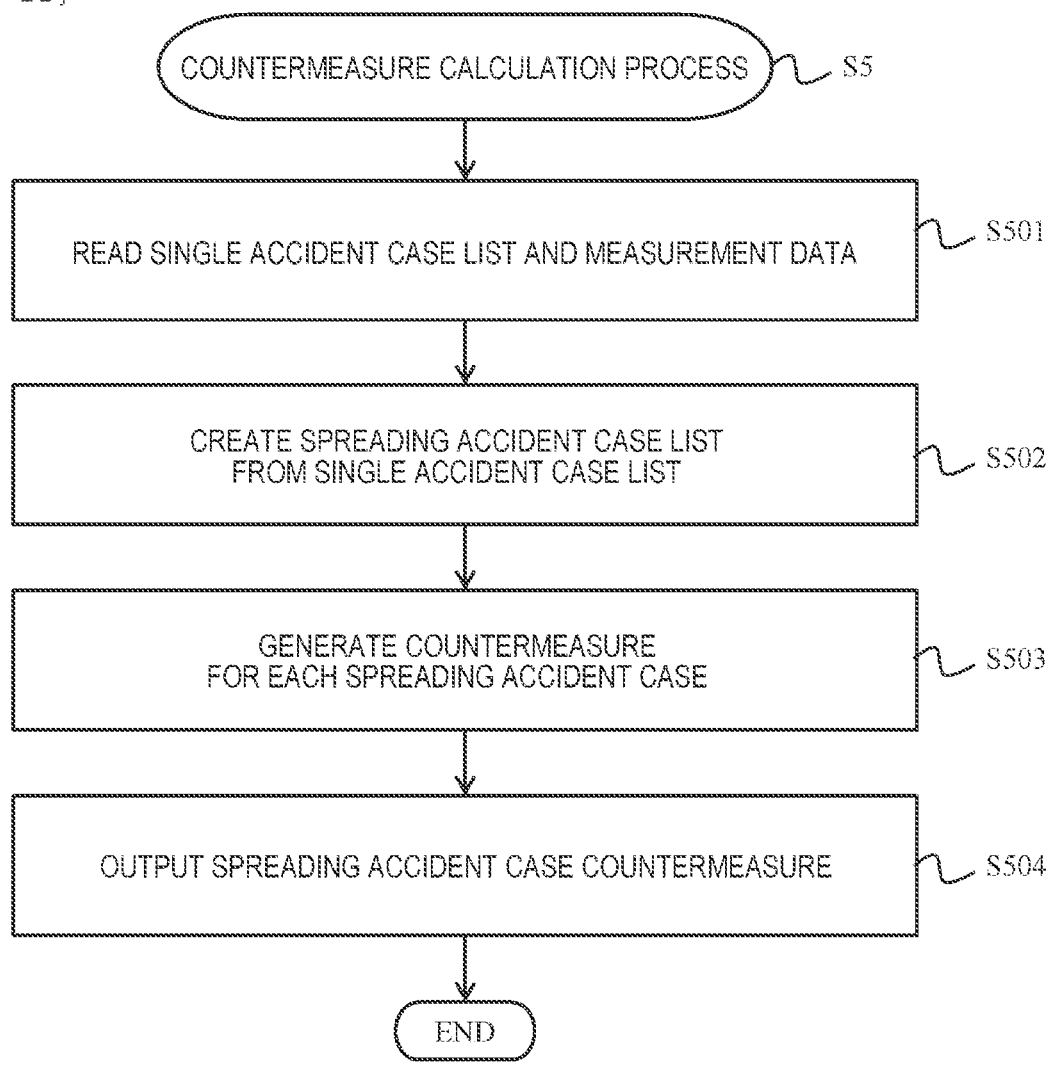

[FIG. 12]
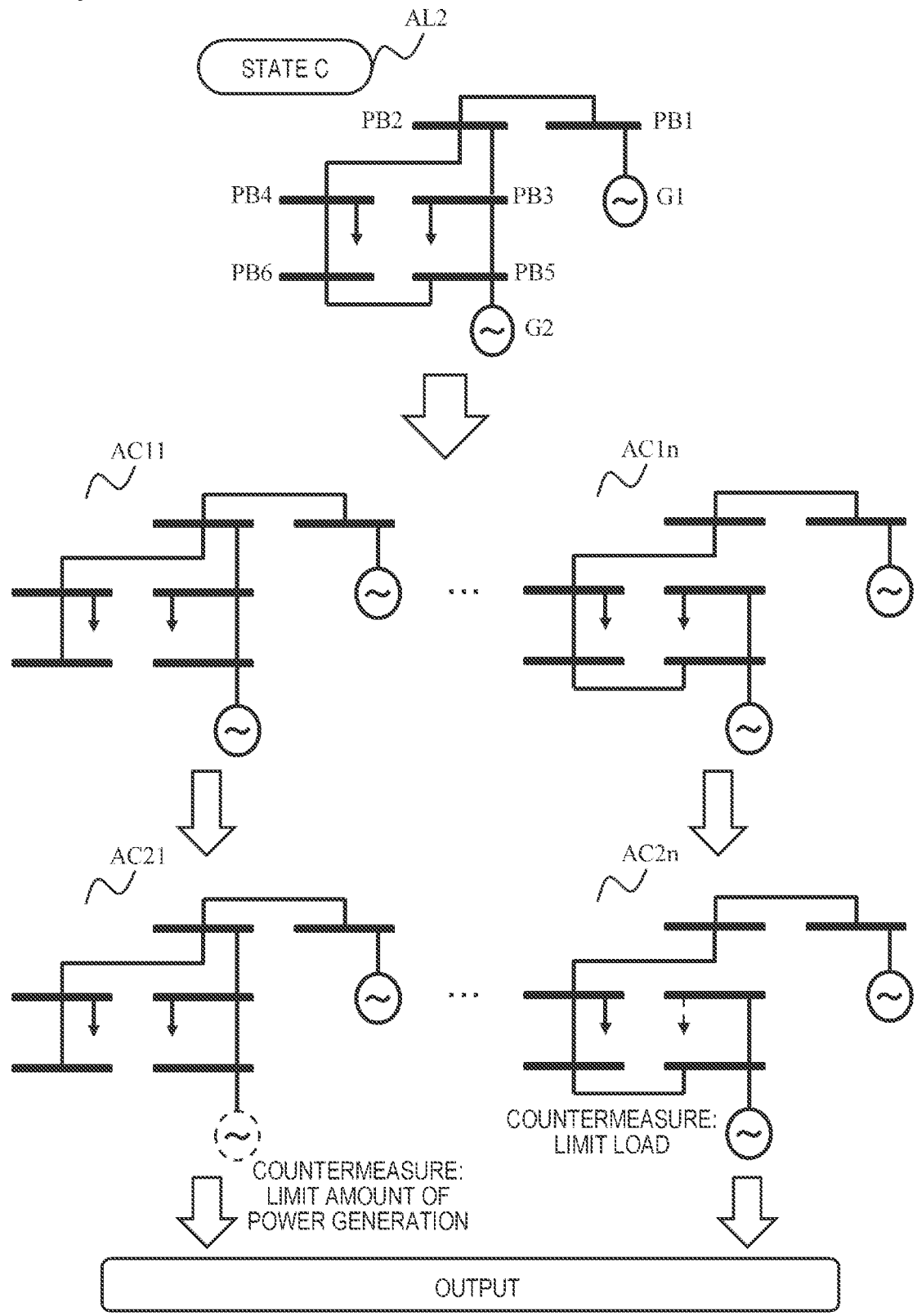

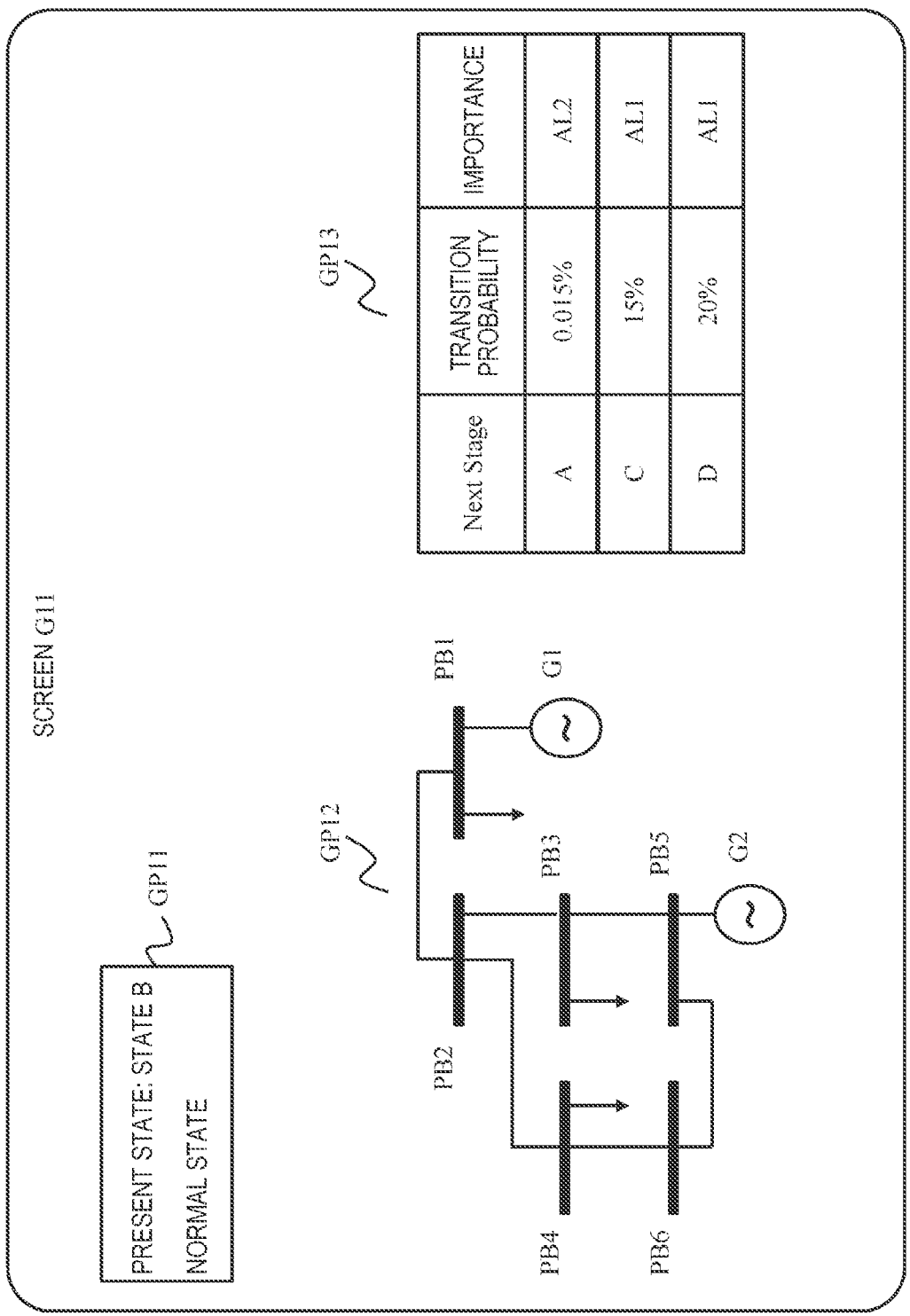

[FIG. 14]
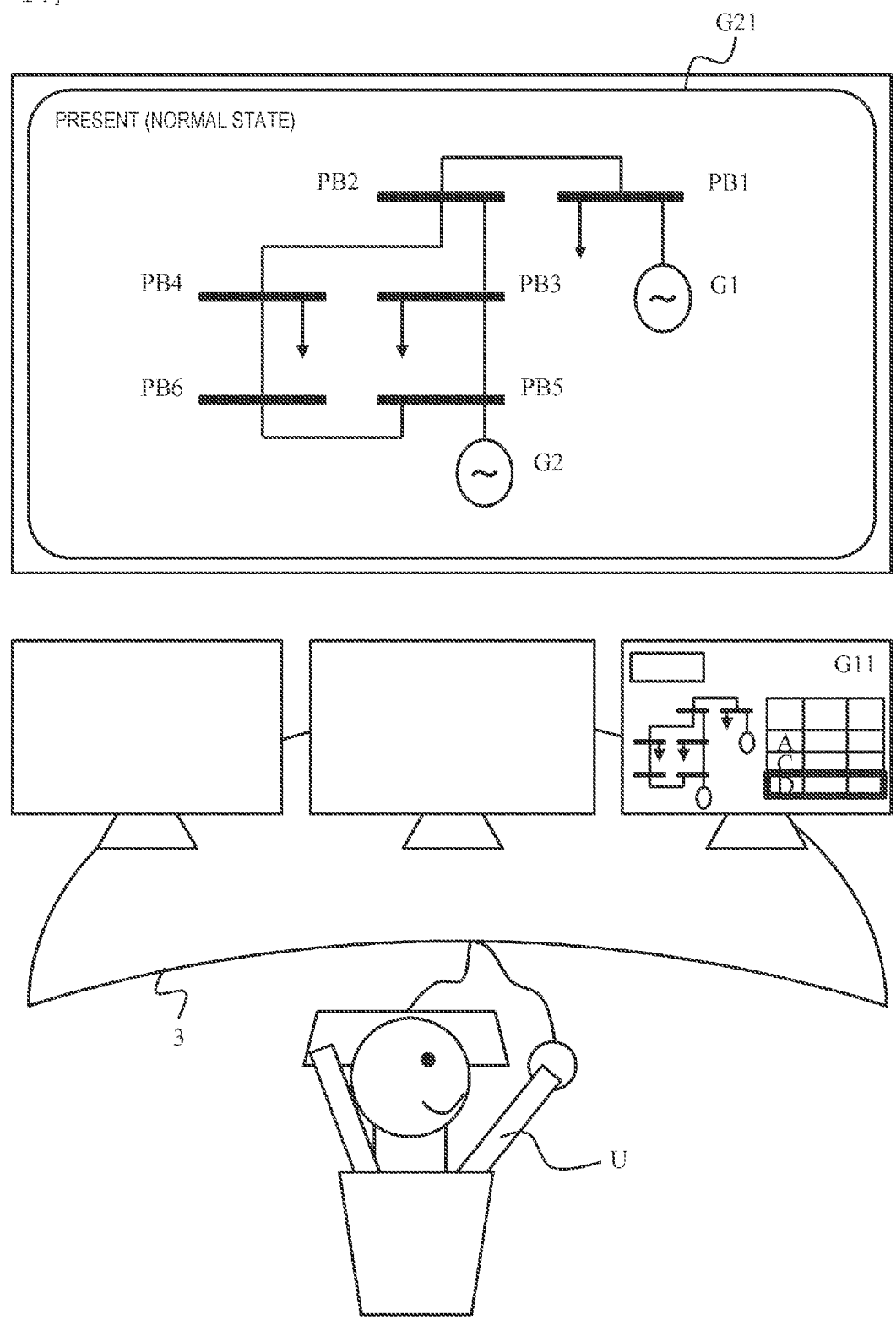

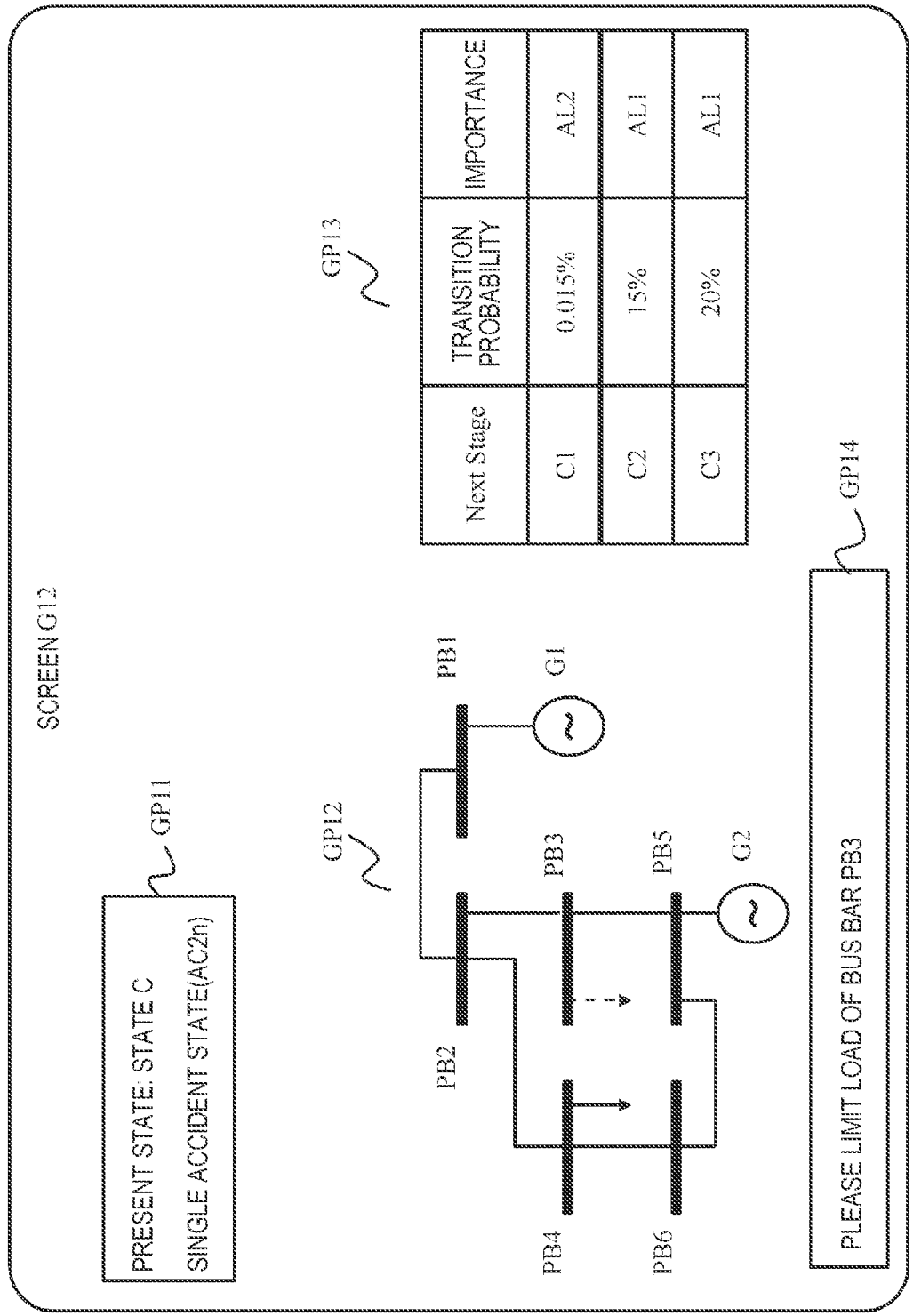

[FIG. 16]
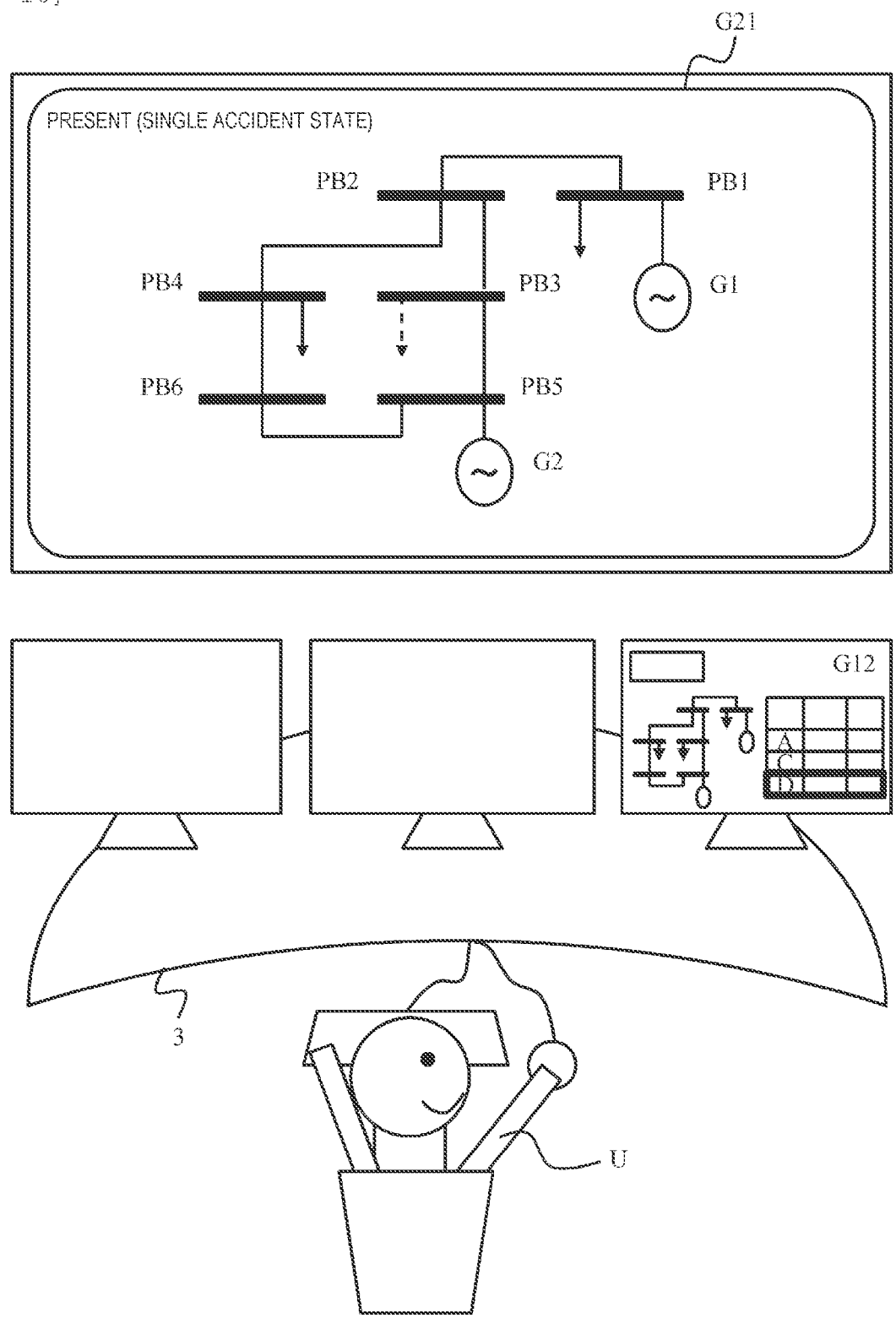

[FIG. 17]
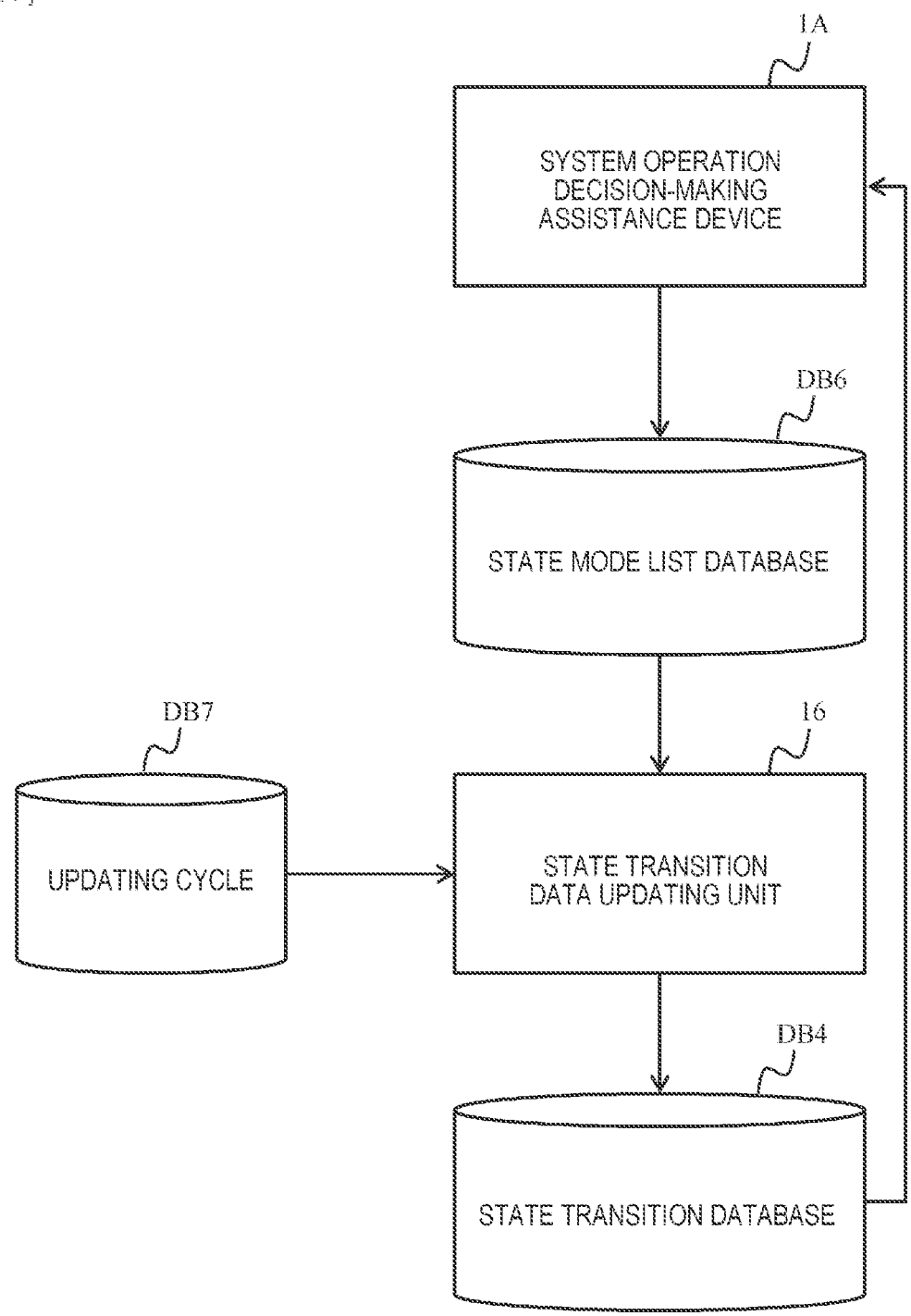

[FIG. 18]
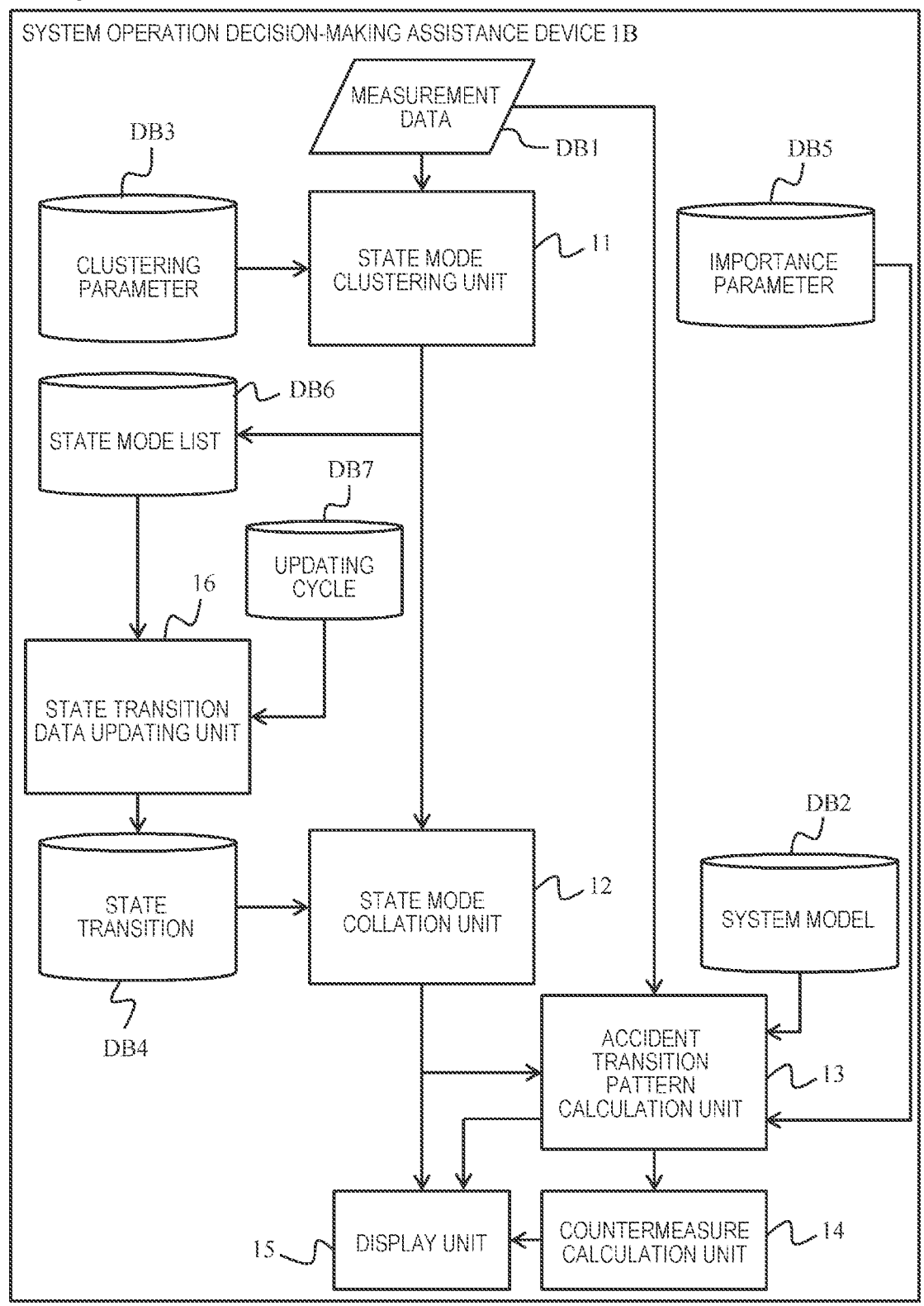

[FIG. 19]
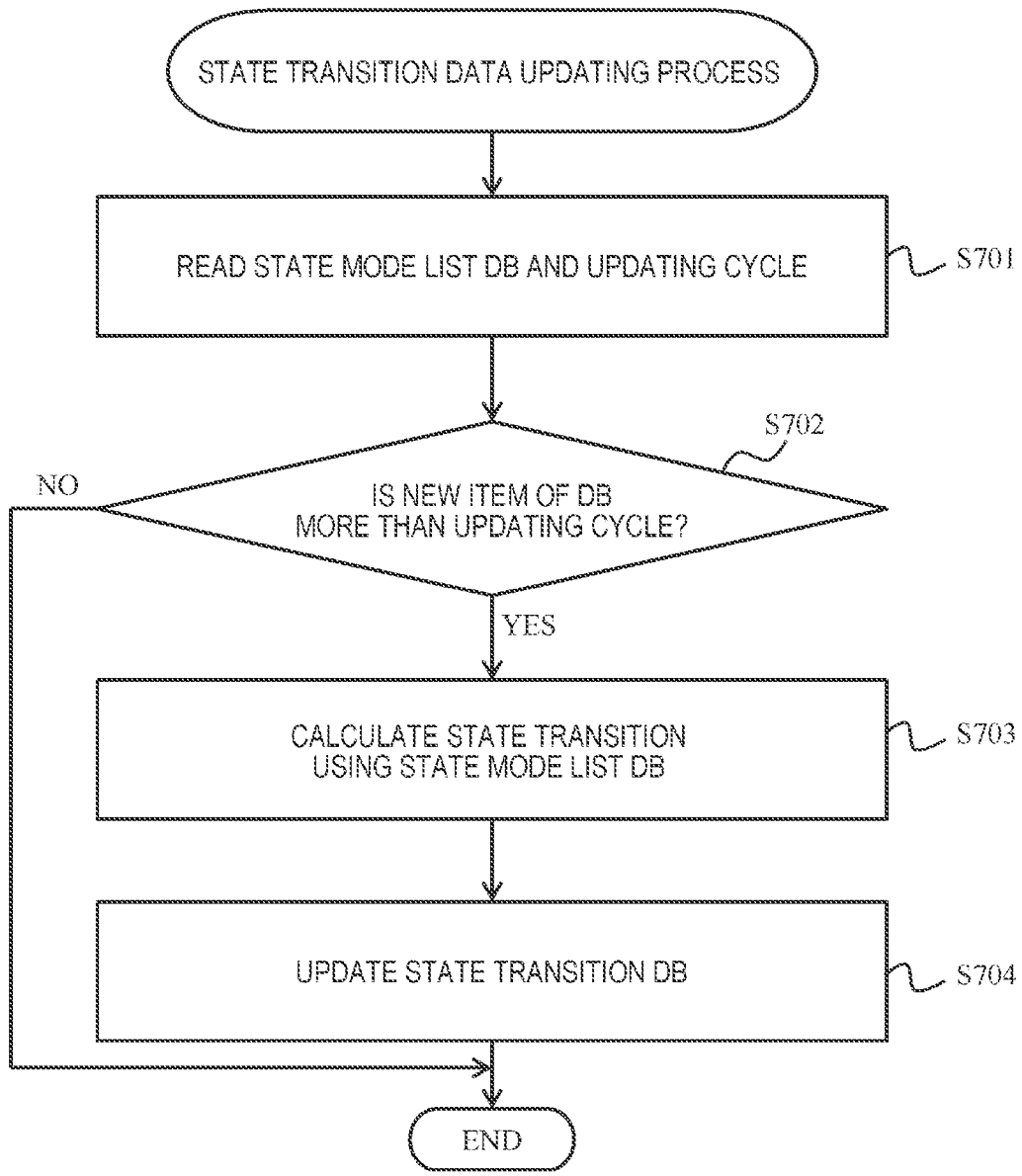

[FIG. 20]
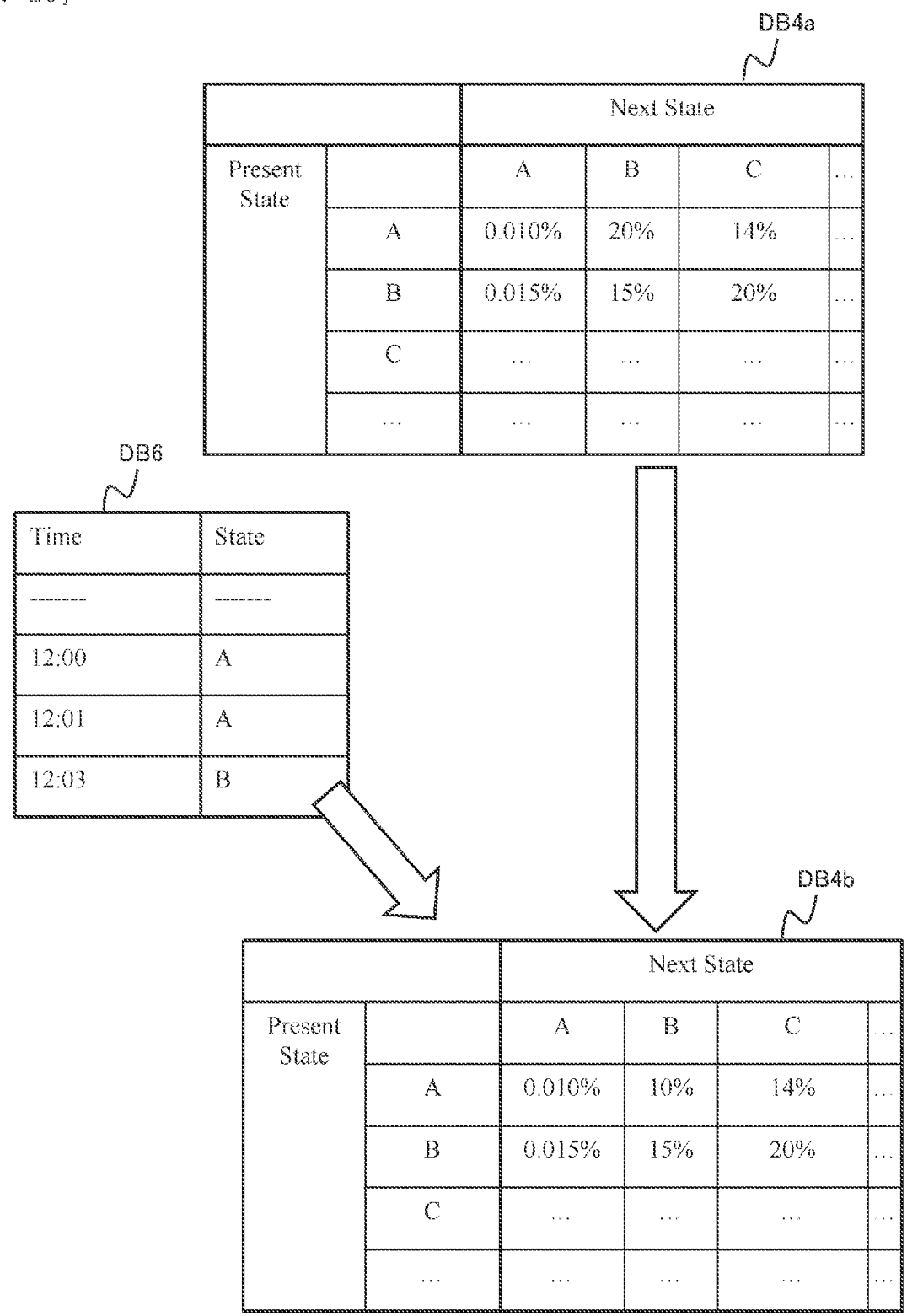

SYSTEM OPERATION DECISION-MAKING ASSISTANCE DEVICE AND METHOD

TECHNICAL FIELD

The present invention relates to a system operation decision-making assistance device and a method.

BACKGROUND ART

In recent years, distributed power supplies using renewable energy such as solar power generation devices and wind power generation devices have become widespread. Since output power of distributed power supplies fluctuates greatly depending on the weather, a large number of distributed power supplies are connected to a power system, so that the power system becomes complicated.

JP-A-2007-288878 (PTL 1) showing the background of the present invention discloses that "a power system stabilizing system includes a system severity determination device that includes severity index value calculation means using online data on the state of a power system, and a system monitoring system which changes facilities within the system against the failure of the system on the basis of an instruction. The system severity determination device performs state simulation of the power system for a short period of time (for example, a second) after the occurrence of a failure. From the results, a first index value Ke which is a maximum value of the rate of increase based on the state before occurrence of a failure of kinetic energy of a generator and a second index value KE which is a maximum value of an integral value of the rate of increase are obtained. An assumed failure of an unstable power system is selected using these index values, and system severities are obtained and ranked".

CITATION LIST

Patent Literature

PTL 1: JP-A-2007-288878

SUMMARY OF INVENTION

Technical Problem

In PTL 1, the state of the system is ascertained using system information and state estimation, a control priority in the system monitoring system is obtained on the basis of the degree of stability, it is not computed how much probability the system will change to what state in the future, and there is room for improvement in terms of usability.

The present invention is contrived in view of the above-described problems, and an object thereof is to provide a system operation decision-making assistance device and a method which are capable of improving usability.

Solution to Problem

In order to solve the above-described problems, a system operation decision-making assistance device according to the present invention, which is a system operation decision-making assistance device that supports operation decision-making of a power system, includes a state mode clustering unit that calculates which state mode among predetermined state modes applies to the power system on the basis of measurement data obtained from the power system and a clustering parameter for clustering the measurement data, a state mode collation unit that collates state transition data indicating transition between the state modes with the calculated state mode to calculate state transition probability data which is a probability that the calculated state mode transitions to each state mode defined in the state transition data, and an accident transition pattern calculation unit that calculates an important accident case on the basis of a system model obtained by modeling a configuration of the power system, an importance parameter including an importance of an accident of the power system, the measurement data, and the calculated state transition probability data.

Advantageous Effects of Invention

According to the present invention, it is possible to compute in which state mode a power system is and to calculate a probability that an important accident case occurs from the state mode. For this reason, it is possible to narrow down an arithmetic operation range for important accidents and to reduce time required for countermeasure planning, and usability is also improved.

BRIEF DESCRIPTION OF DRAWINGS

FIG. 1 is a functional configuration diagram of a system operation decision-making assistance device.

FIG. 2 is a hardware configuration diagram of the system operation decision-making assistance device.

FIG. 3 is a flowchart of the entire processing performed by the system operation decision-making assistance device.

FIG. 4 is an example of measurement data.

FIG. 5 is a flowchart showing a portion of the processing in FIG. 3 and details of a state mode clustering process.

FIG. 6 is a diagram illustrating an example of state mode clustering.

FIG. 7 is a flowchart showing a portion of the processing in FIG. 3 and details of a state transition collation process.

FIG. 8 is a diagram illustrating an example of collation between state modes.

FIG. 9 is a flowchart showing a portion of the processing in FIG. 3 and details of an important accident calculation process.

FIG. 10 is a diagram illustrating an example of calculation of a single accident case.

FIG. 11 is a flowchart showing a portion of the processing in FIG. 3 and details of a countermeasure calculation process.

FIG. 12 is a diagram illustrating an example of calculation of a spreading accident case.

FIG. 13 is a screen showing a display example in which a system is in a normal state.

FIG. 14 is an example of use in a control room in a case where the system is in a normal state.

FIG. 15 is a screen showing a display example of a state where a single accident occurs.

FIG. 16 is an example of use in a control room in a case where a single accident occurs.

FIG. 17 relates to a second example and is an overall configuration diagram showing a state where state transition data is updated online.

FIG. 18 is an overall configuration diagram showing a state where state transition data is updated inside the system operation decision-making assistance device.

FIG. 19 is a flowchart showing a process of updating state transition data.

FIG. 20 is a diagram illustrating comparison between before and after updating of state transition data.

DESCRIPTION OF EMBODIMENTS

Hereinafter, an embodiment of the present invention will be described on the basis of the accompanying drawing. In a case where a single accident occurs in a power system (hereinafter, may be abbreviated as a system), a processing load required for planning of a countermeasure for the single accident is in direct proportion to the size of the system. On the other hand, in a case where a spreading accident occurs in the system, a processing load required for planning of a countermeasure for each spreading accident is in proportion to the square of the size of the system. Therefore, normally, an enormous amount of arithmetic operation time is required for planning a countermeasure for each spreading accident. Hereinafter, a database may be abbreviated as DB.

Consequently, in the present embodiment, a state mode of the system is calculated through a clustering process on the basis of measurement data DB1 and a clustering parameter DB3, and the calculated state mode is collated with state transition DB4. Thereby, in the present embodiment, since the transition of a state mode can be predicted, an arithmetic operation range related to a spreading accident case can be narrowed down. As a result, it is possible to plan a countermeasure for a spreading accident. In this manner, in the present embodiment, a countermeasure for a spreading accident can be planned on the basis of clustering parameters and state transition data, and thus it is possible to support operation of a user who is a system operator.

Example 1

An example will be described with reference to FIGS. 1 to 16. The example to be described below is just an example, and the present invention is not limited to a configuration of the example. The present example shows a case where a system operation decision-making assistance device according to the present invention is applied to a stability monitoring system of the system.

FIG. 1 shows an example of the overall configuration of a system operation decision-making assistance device 1 according to the present example. The system operation decision-making assistance device 1 can be configured using one or a plurality of computers as will be described later in FIG. 2. Hereinafter, the system operation decision-making assistance device 1 may be abbreviated as an assistance device 1.

The assistance device 1 includes processing units 11 to 15 and data management units DB1 to DB5. For example, a state mode clustering unit 11, a state mode collation unit 12, an accident transition pattern calculation unit 13, a countermeasure calculation unit 14, and a display unit 15 can be included in the processing unit. For example, measurement data DB1, a system model DB2, a clustering parameter DB3, state transition data DB4, and an importance parameter DB5 can be included in the data management unit.

Note that, a plurality of processing units may be integrated into one processing unit, or one processing may be executed by a plurality of processing units. Similarly, regarding data management, a plurality of data groups may be managed by one data management unit, or a data group managed by one data management unit may be managed by a plurality of data management units.

The state mode clustering unit 11 has a function of calculating a state mode using the measurement data DB1 and the clustering parameter DB3 as inputs. The state mode collation unit 12 has a function of calculating transition probability data using the state mode calculated by the state mode clustering unit 11 and the state transition data DB4 as inputs. The accident transition pattern calculation unit 13 has a function of outputting a list of important single accident cases using the transition probability data calculated by the state mode collation unit 12, the measurement data DB1, the importance parameter DB5, and the system model DB2 as inputs. The countermeasure calculation unit 14 has a function of calculating a countermeasure for a spreading accident case using the important single accident case list calculated by the accident transition pattern calculation unit 13 as an input.

The display unit 15 has a function of generating a screen G including at least one or more of the transition probability data calculated by the state mode collation unit 12 and the countermeasure for a spreading accident case which is calculated by the accident transition pattern calculation unit 13 as inputs.

An example of the screen G to be generated by the display unit 15 and provided to a user who is a system operator is shown on the lower side of FIG. 1. The screen G includes, for example, a region GP11 for displaying a state mode, a region GP12 for displaying the state of the system which is predicted, a region GP13 for displaying state modes to which transition is likely to be performed, a probability of transition to the modes, and the like, and a region GP14 for presenting a countermeasure. In a predicted system state diagram, for example, generators G1 and G2 and bus bars PB1 to PB6 are displayed.

FIG. 2 shows an example of a hardware configuration of the assistance device 1 and an example of the overall configuration of the power system 2. The power system 2 includes, for example, a plurality of measuring instruments 21($l$) to 21($n$). In a case where the measuring instruments are not particularly distinguished from each other, the measuring instruments may be abbreviated as a measuring instrument 21.

The measuring instruments 21 measure a measurement value in the power system 2 and transmits measurement effects thereof to a communication unit 113 of the assistance device 1 through a communication network CN. The assistance device 1 stores measurement data received from the measuring instruments 21 in a memory 112.

The measuring instrument 21 is a measuring apparatus or a measuring device, such as a phasor measurement unit (PMU), a voltage transformer (VT), a potential transformer (PT), a current transformer (CT), or a telemeter (TM), which is installed in the power system 2. The measuring instrument 21 may be installed in the power system 2 as a device for aggregating measurement values, such as supervisory control and data acquisition (SCADA).

Here, the measurement data DB1 which is a measurement value is data on the power system 2 which is measured by the measuring instrument 21. The measurement data DB1 is either one or both of a voltage and a current which are power information with a synchronization time using a GPS or the like. The measurement data D1 may include, for example, a specific number for identifying data and a time stamp.

A configuration of the assistance device 1 will be described. The assistance device 1 includes, for example, a microprocessor (central processing unit: CPU) 111, the memory 112, the communication unit 113, an input unit 114, an output unit 115, the databases DB2 to DB5, and program databases 101 to 104, which are connected to each other so as to be able to bi-directionally communicate with each other through a bus 116.

The CPU 111 may be configured as one or a plurality of semiconductor chips or may be configured as a computer device such as a computation server. The memory 112, which is configured as, for example, a random access memory (RAM), stores computer programs read out from the program databases 101 to 104 and stores computation result data, image data, and the like required for processes. The screen data stored in the memory 112 is transmitted to the output unit 115 and displayed. An example of a screen to be displayed will be described later.

The CPU 111 executes the computation programs read out from the program databases 101 to 104 to the memory 112 to perform arithmetic processing such as calculation of a change value, adjustment of an analysis time frame, abnormality detection of a statistical type, correction of an abnormality detection result, determination of similarity, calculation of an operation support, indication of image data to be displayed, and retrieval of data in each database.

That is, the state mode clustering unit 11 shown in FIG. 1 is realized by reading and executing the state mode clustering program database 101 by the CPU 111. Similarly, the state mode collation unit 12 shown in FIG. 1 is realized by reading and executing the state mode collation program database 102 by the CPU 111. The accident transition pattern calculation unit 13 shown in FIG. 1 is realized by reading and executing the accident transition pattern calculation program database 13 by the CPU 111. The countermeasure calculation unit 14 shown in FIG. 1 is realized by reading and executing the countermeasure calculation program database 104 by the CPU 111.

The memory 112 is a memory that temporarily stores the measurement data DB1, image data for display, computation temporary data such as computation result data, computation result data, and the like. The CPU 111 computes necessary image data and outputs the computed image data from the output unit 115. The display unit 15 is realized by outputting a screen by the output unit 115. Note that the memory 112 is not limited to a physical memory and may be a virtual memory.

The assistance device 1 may include a storage device such as a solid state drive (SSD) or a hard disk drive (HDD). The assistance device 1 may store the program databases 101 to 104 and the databases DB1 to DB5 in the memory 112 from the storage device such as an SSD and may transmit the stored databases from the storage device to the memory 112 as necessary.

The communication unit 113 includes a circuit and a communication protocol for connection to the communication network CN. The communication unit 113 communicates with the measuring instruments 21 to receive the measurement data DB1 from the measuring instruments 21.

The input unit 114 receives information to be input by a user through an input device such as a keyboard, a pointing device such as a mouse, a touch panel, a push button switch, or a sound instructing device.

The output unit 115 provides information to a user through an output device such as a display, a printer, or a sound synthesis device. As the input unit 114 and the output unit 115, devices of a plurality of types such as a keyboard and a touch panel, a touch panel and a push button switch, or a display and a sound synthesis device can be used.

The databases DB2 to DB5 included in the assistance device 1 will be described. In the system model database DB2, a software model simulating the power system. 2 is accumulated. In the clustering parameter database DB3, a parameter for clustering and a classification cluster are accumulated. In the state transition database DB4, state transition data derived from the past state mode list is accumulated. The importance parameter database DB5 includes one or more of the importance of an accident in the power system 2, a weak part of the power system 2, the year of installation of facilities in the power system 2, and the like. An example of each data will be described later.

FIG. 3 is an example of a flowchart showing the entire processing of the assistance device 1. Details will be described along steps S1 to S6.

The assistance device 1 reads the measurement data DB1 from the memory 112 (S1). The measurement data DB1 will be described using FIG. 4. In the present example, the measurement data DB1 indicates measurement values in general in the power system 2. The measurement data DB1 is data measured by a measuring instrument such as a PMU or SCADA, or the like. As shown in FIG. 4, a plurality of pieces of information may be accumulated in each time section in the measurement data DB1, and the measurement data DB1 may include missing data or may be information other than the information on the power system. In the present example, it is assumed that streaming input of a voltage, a current, and active power included in PMU data and a sensor status indicating an opening and closing path of an apparatus is performed at certain fixed cycles.

Description will return to FIG. 3. The state mode clustering unit 11 clusters state modes on the basis of the measurement data DB1 and the clustering parameter DB3 (S2). Details of state mode clustering will be described using FIG. 5.

As shown in FIG. 5, the state mode clustering unit 11 reads the measurement data DB1 and the clustering parameter DB3 (S201). The clustering parameter DB3 includes, for example, one or more of a method used for clustering, a threshold value required for clustering, and the definition of a vector space. The clustering parameter DB3 may include a state mode which is arithmetically operated as feature data in advance.

The state mode clustering unit 11 vectorizes measurement data (S202). The state mode clustering unit 11 classifies the vectorized data through clustering to calculate a state mode (S203). In addition, the state mode clustering unit 11 outputs the calculated state mode (S204).

Operations of the state mode clustering unit 11 will be described using FIG. 6. FIG. 6(*a*) is an example of the measurement data DB1 to be input to the state mode clustering unit 11. As shown in FIG. 6(*b*), the state mode clustering unit 11 vectorizes the measurement data DB1 and represents the vectorized measurement data as feature amount space coordinates S2A. For the vectorization of the measurement data, a method of extracting feature amounts and capturing data in another space, such as Prony analysis, Fourier transformation, or edge detection, is used.

As shown in FIG. 6(*c*), the feature amount space coordinates S2A specify an approximate state mode using the clustering parameter DB3. Thereby, it is possible to identify a state mode to which the input measurement data DB1 belongs. These modes may be, for example, a tidal current state or an accident state in the system 2. As shown in FIG. 6(*c*), a state mode to which the measurement data DB1 belongs may be classified as a state mode "B" in the example shown in the drawing.

Description will return to FIG. 3. The state mode collation unit 12 collates transition of a state mode on the basis of a state mode and state transition data.

A process of collating a transition destination of a state mode will be described using FIG. 7. The state mode collation unit 12 reads the state mode and the state transition data DB4 (S301). The state mode collation unit 12 collates the state mode serving as a transition destination of a target state mode (S302). The state mode collation unit 12 extracts transition probability data which is a probability of transition to a state mode which is a transition destination (S303). The state mode collation unit 12 outputs the state mode which is a transition destination and the transition probability data in association with each other (S304).

Operations of a process of collating a transition destination of a state mode (S3) will be described using FIG. 8. The state mode collation unit 12 collates the present state mode on the state transition data DB4. For example, the state transition data DB4 includes at least any one of a probability of transition from the present state mode to the next state mode and a time until transition to the next state mode. In FIG. 8, required transition times such as a time "Tab" of transition from a state mode "A" to a state mode "B" and a time "Tbc" of transition from the state mode "B" to a state mode "C" are shown. A state mode to which the present state mode may transition and a probability that the transition is performed can be calculated by the state mode collation unit 12. In the example of FIG. 8, the present state mode is "B", and there are four states of "A", "B", "C", and "D" to which the present state mode may transition.

Description will return to FIG. 3. The accident transition pattern calculation unit 13 calculates an important accident (S4). Details of a process of calculating an important accident will be described using a flowchart of FIG. 9.

The accident transition pattern calculation unit 13 reads the measurement data DB1, the transition probability data, the importance parameter DB5, and the system model DB2 (S401). The accident transition pattern calculation unit 13 calculates candidates of a system state after t seconds from the data read in step S401 (S402). A time interval "t" used for prediction may be input in advance or may be input by a user.

The accident transition pattern calculation unit 13 ranks the importance of the system state candidates after t seconds on the basis of the system model DB2 (S403). The accident transition pattern calculation unit 13 calculates an important single accident case list assumed from a case of a higher importance rank (S404). The accident transition pattern calculation unit 13 outputs the calculated important single accident case list (S405).

Operations of a process of calculating an important accident (S4) will be described using FIG. 10. A transition state of which a transition probability is equal to or less than a predetermined value is excluded using state transition probability data. In FIG. 10, transition from a state "B" to a state "E", and the like are excluded. Thereby, it is possible to screen a range in which a state transition probability is selected. In the drawing, a state mode may be abbreviated as a "state".

Next, each of transitionable states will be evaluated using the system model DB2 and the importance parameter DB5. The system model DB2 includes, for example, one or more of parameters of a generator, a model type of the generator, an impedance of a transmission line, parameters of a control device, and the like in the system 2.

The importance parameter DB5 includes, for example, information on main electric wires, weak electric wires, apparatuses, and the like in the system 2. It is possible to evaluate the importance of a transitionable state (state mode) by collating the importance parameter DB5, the system model DB2, and the transitionable state with each other. In the example of FIG. 10, it is assumed that states "A", "C", and "D" to which the state "B" can transition are single accidents in the power system 2.

It is possible to calculate accident importance AL1, AL2, and AL3 by collating these single accidents, the importance parameter DB5, and the system model DB2 with each other. Thereby, it is possible to exclude a case of a low accident importance and to output only a case of a high importance. Therefore, according to the present example, it is possible to appropriately narrow down a computation range. In the example of FIG. 10, it is assumed that the state "C" and the state "D" are output.

Description will return to FIG. 3. The countermeasure calculation unit 14 calculates a countermeasure for an important accident case (S5). A detailed processing flow will be described using FIG. 11. The countermeasure calculation unit 14 reads the single accident case list calculated by the accident transition pattern calculation unit 13 and the measurement data DB1 (S501).

The countermeasure calculation unit 14 creates a spreading accident list from the single accident case list (S502). The countermeasure calculation unit 14 generates a countermeasure for a spreading accident case list (S503). The countermeasure calculation unit 14 outputs the generated spreading accident case countermeasure (S504).

Operations of a process of calculating a countermeasure (S5) will be described using FIG. 12. In FIG. 12, a single accident defined by a state "C" and a state "D" is used as an input.

Regarding the state "C", a state from a spreading accident case AC11 to a spreading accident case AC1$n$ is assumed. Countermeasures for respective spreading accident cases are calculated as a spreading accident countermeasure AC21 to a spreading accident countermeasure AC2$n$ using the system model DB2 and the measurement data DB1.

The spreading accident countermeasure, such as a decrease in the amount of power generation of a generator and the restriction of a load, is performed with respect to all apparatuses and operation patterns which are controllable by a control device such as SCADA. Thereby, it is possible to prepare countermeasures for all accidents that are likely to spread from a screened single accident case.

Description will return to FIG. 3. The display unit 15 displays all or some of the pieces of information obtained in steps S1 to S5 on a display or the like (S6). The assistance device 1 can support a system operator's decision-making through contents displayed in step S6.

An example of a screen G11 to be provided to a user who is a system operator in a case where the system 2 is operated in a stable state will be described using FIG. 13. The screen G11 in a case where the system 2 is operated in a stable state includes, for example, a state mode display unit GP11 showing the present state mode, a system prediction display unit GP12 visualizing a system state having the highest importance in a case of transition, and a transition probability display unit GP13 showing a probability of transition and an importance of a system state.

In the example of FIG. 13, the system 2 is operated in a stable state and is identified as a state "B" in the state mode display unit GP11. In the transition probability display unit GP13, a transitionable state (state mode), a probability of transition, and an importance are displayed in association with each other. In the system prediction display unit GP12, a state "A" having the highest importance among the states displayed on the transition probability display unit GP13 is displayed.

In the system prediction display unit GP12, a user can operate the transition probability display unit GP13 so as to perform switching to a system state in another transitionable state displayed on the transition probability display unit GP13 and display the system state.

An example of application of the screen G11 in system operation to a control room will be described using FIG. 14. A large screen G21 is displayed in front of a user U within the control room. One of a plurality of screens displayed on a console operated by the user U is the screen G11 described in FIG. 13.

The screen G21 is a screen of a monitoring control device such as a wide-area monitoring system (WAMS). The user monitors a system state through the screen G21. On the other hand, the user U can predict and monitor the state of an important system accident which will occur from now on through the screen G11 on the console. As a result, according to the present example, it is possible to present appropriate information to the user who is a system operator and to accelerate the user's decision-making.

An example of a screen G12 in a case where a single accident occurs in the system 2 will be described using FIG. 15. In the example of FIG. 15, the system 2 is operated in a state where a single accident has occurred and is identified as a state "C" which is a single accident state in the state mode display unit GP11 of the screen G12. A probability of transition is displayed on the transition probability display unit GP13 of the screen G12. In the system prediction display unit GP12 of the screen G12, states "C1", "C2", and "C3" that are likely to spread and occur from now on are displayed together with a probability of transition and an importance. In FIG. 15, it is assumed that an importance of the spreading accident state "C1" is the highest.

The screen G12 can also display the countermeasure GP14 for a spreading accident state. In the system prediction display unit GP12, it is also possible to display system states in the other transitionable states displayed on the transition probability display unit GP13. In a case where the system states in the other transitionable states are displayed, contents of the countermeasure GP14 to be displayed also change.

FIG. 16 is an example in which the screen G12 is displayed in a control room. It is assumed that the user U who is a system operator monitors a system state being operated in a single accident state through the screen G21. Further, the user U can monitor a possibility that a spreading accident occurs and confirm a countermeasure for spreading accident through the screen G12 on the console. Thereby, according to the present example, it is possible to present appropriate information to the user who is a system operator and to predict and appropriately manage the occurrence of a spreading accident.

According to the system operation decision-making assistance device 1 of the present example which is configured in this manner, which state mode applies to the power system is computed on the basis of measurement data, and a probability that a certain state mode transitions to each of other state modes is computed. For this reason, in the present example, it is possible to predict the occurrence of an important accident case by restricting a computation range. Thereby, according to the system operation decision-making assistance device 1 of the present example, it is also possible to predict a spreading accident, and thus usability is improved.

Example 2

A second example will be described using FIGS. 17 to 20. The present example corresponds to a modification example of the first example, and thus differences from the first example will be mainly described. In the present example, the state transition data DB4 described in the first example is updated.

FIG. 17 is a block diagram of a system according to the present example. In the present example, a state mode output from an assistance device 1A is accumulated in a state mode list database DB6. A state transition data updating unit 16 outputs state transition data DB4 using an updating cycle DB7 and a state mode list database DB6 as inputs. State transition data output by the state transition data updating unit 16 is stored in the state transition database DB4. The state transition DB4 can be provided separately from the database DB4 within the system operation decision-making assistance device 1A.

FIG. 17 shows an example in which the state mode list database DB6, the state transition data updating unit 16, and the like are provided outside the system operation decision-making assistance device 1A. Alternatively, as shown in FIG. 18, the state mode list database DB6, the state transition data updating unit 16, and the like can also be provided within a system operation decision-making assistance device 1B. Also in the example of FIG. 18, the state transition data DB4 can be updated to the latest contents.

A process of updating state transition data will be described using a flowchart of FIG. 19. The state transition data updating unit 16 reads the state mode list database DB6 and the updating cycle DB7 (S701). The state transition data updating unit 16 confirms whether or not a new item of the state mode list database DB6 exceeds the updating cycle DB (S702).

In a case where the new item is less than the updating cycle DB7 (S702: NO), the present process is stopped. In a case where the new item exceeds the updating cycle DB7 (S702: YES), the state transition data updating unit 16 calculates the state transition database DB4 using the state mode list database DB6 (S703). The state transition data updating unit 16 updates the state transition database DB4 on the basis of the calculated data (S704).

A state where the state transition database DB4 is updated is shown using FIG. 20. The state transition data updating unit 16 calculates a state transition database DB4$b$ after updating by using the state mode list database DB6. Thereby, state transition different from a state transition database DB4$a$ before updating is constructed. Therefore, it is possible to construct the state transition database DB4 with higher accuracy. As a result, according to the present example, it is possible to improve the accuracy of prediction of an important accident case and a spreading accident case on the basis of the state transition database DB4 with high accuracy.

Note that the present invention is not limited to the above-described embodiment. Those skilled in the art can perform various additions, modifications, and the like within the scope of the present invention. In the above-described embodiment, the present invention is not limited to the configuration examples shown in the accompanying drawings. The configuration and the processing method of the embodiment can be appropriately changed within the scope in which the object of the present invention is achieved.

In addition, components of the present invention can be arbitrarily selected, and the invention including selected configurations is also included in the present invention. Further, the configurations described in the claims can be combined with each other in addition to the combinations clearly indicated in the claims.

REFERENCE SIGNS LIST 1, 1A, 1B: system operation decision-making assistance device
2: power system
3: console
11: state mode clustering unit
12: state mode collation unit
13: accident transition pattern calculation unit
14: countermeasure calculation unit
15: display unit
17: state transition data updating unit
DB1: measurement data
DB2: system model
DB3: clustering parameter
DB4: state transition data
DB5: importance parameter
DB6: state mode list database
DB7: updating cycle

The invention claimed is:

1. A system operation decision-making assistance device comprising:
at least one storage device storing at least one program and measurement data obtained by measuring instruments from a power system;
at least one processor, which when executing the at least one program, configure the at least one processor to:
calculate which state mode among predetermined state modes applies to the power system on the basis of the measurement data obtained from the power system and a clustering parameter for clustering the measurement data;
collate state transition data indicating transition between the state modes with the calculated state mode to calculate state transition probability data which is a probability that the calculated state mode transitions to each state mode defined in the state transition data;
calculate a plurality of accident cases and their relative importance on the basis of a plurality of system models obtained by modeling a configuration of the power system, a plurality of importance parameters each including an importance of an accident of the power system, the measurement data, and the calculated state transition probability data;
calculate, for certain ones of the plurality of accident cases based on their relative importance, other accident cases predicted to spread from the certain ones of the plurality of accident cases; and
calculate countermeasures for each of the other accident cases; and
a plurality of display screens that simultaneously display the state transition probability data, the other accident cases, and at least one of the calculated countermeasures,
wherein the processor is further configured to perform the at least one of the calculated countermeasures by performing at least one of decreasing an amount of power generation of a generator and restricting a load, in response to an input from an operator after the display of the state transition probability data.

2. The system operation decision-making assistance device according to claim 1, wherein
the state transition data includes at least a probability that transition is performed between states.

3. The system operation decision-making assistance device according to claim 1, further comprising:
a state mode list database that stores a state mode; and
a state transition data updating unit that updates the state transition data from the state mode list database and an updating cycle.

4. The system operation decision-making assistance device according to claim 1, wherein the at least one processor is further configured to:
calculate the state mode using one or more of a signal processing method and an analysis method specific to the power system.

5. The system operation decision-making assistance device according to claim 1, wherein
the clustering parameter includes at least any one of a method used for clustering, a threshold value required for clustering, definition of a vector space, and a state mode which is arithmetically operated as feature data in advance.

6. The system operation decision-making assistance device according to claim 1, wherein
the importance parameter includes at least any one of a weak part of the power system and the year of installation of facilities in the power system, in addition to the importance.

7. The system operation decision-making assistance device according claim 1, wherein
the system model includes at least any one of parameters of the generator, a model type of the generator, an impedance of a transmission line, parameters of a control device, and the like in the power system.

8. A system operation decision-making assistance method comprising the steps of:
acquiring and storing measurement data using measuring instruments from a power system;
calculating which state mode among predetermined state modes applies to the power system on the basis of the acquired measurement data and a clustering parameter for clustering the measurement data;
collating state transition data indicating transition between the state modes with the calculated state mode to calculate state transition probability data which is a probability that the calculated state mode transitions to each state mode defined in the state transition data;
calculating a plurality of accident cases and their relative importance on the basis of a plurality of system models obtained by modeling a configuration of the power system, a plurality of importance parameters each including an importance of an accident of the power system, the measurement data, and the calculated state transition probability data;
calculating, for certain ones of the plurality of accident cases based on their relative importance, other accident cases predicted to spread from the certain ones of the plurality of accident cases;
calculating countermeasures for each of the other accident cases;
simultaneously displaying the state transition probability data, the other accident cases, and at least one of the calculated countermeasures; and
performing the at least one of the calculated countermeasures by performing at least one of decreasing an amount of power generation of a generator and restricting a load, in response to an input from an operator after the displaying of the state transition probability data.

* * * * *